(12) United States Patent
Dalvi et al.

(10) Patent No.: US 9,762,174 B2
(45) Date of Patent: Sep. 12, 2017

(54) INCREASING PWM RESOLUTION FOR DIGITALLY CONTROLLED MOTOR CONTROL APPLICATIONS

(71) Applicant: Texas Instruments Incorporated, Dallas, TX (US)

(72) Inventors: Jasraj R. Dalvi, Pune (IN); Seil Oh, Plano, TX (US); John K. Rote, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/972,515

(22) Filed: Dec. 17, 2015

(65) Prior Publication Data

US 2016/0233813 A1 Aug. 11, 2016

Related U.S. Application Data

(60) Provisional application No. 62/113,837, filed on Feb. 9, 2015.

(51) Int. Cl.
*G05B 11/28* (2006.01)
*H02P 27/08* (2006.01)

(52) U.S. Cl.
CPC ........ *H02P 27/085* (2013.01); *H02P 2209/09* (2013.01)

(58) Field of Classification Search
CPC . G05B 11/28; H02P 1/46; H02P 27/04; H02P 21/00; H02P 27/06; H03K 4/06; H03K 4/08
USPC .... 318/400.01, 400.02, 400.14, 400.15, 700, 318/701, 721, 799, 800, 801, 599, 811; 363/21.1, 40, 44, 95, 120, 175
See application file for complete search history.

(56) References Cited

U.S. PATENT DOCUMENTS

| | | | | |
|---|---|---|---|---|
| 8,120,401 | B2 * | 2/2012 | Kenly et al. | H03K 7/08 327/172 |
| 8,558,497 | B2 * | 10/2013 | Wright | H03K 7/08 318/34 |
| 9,490,792 | B2 * | 11/2016 | Zhao | H03K 7/08 |
| 9,531,367 | B2 * | 12/2016 | Liu | H03K 7/08 |
| 2008/0159379 | A1 * | 7/2008 | Kris | H03K 7/08 375/238 |

* cited by examiner

*Primary Examiner* — Antony M Paul
(74) *Attorney, Agent, or Firm* — Gregory J. Albin; Charles A. Brill; Frank D. Cimino

(57) ABSTRACT

Systems and methods for increasing Pulse Width Modulation (PWM) resolution for digitally controlled motor control applications are described. For example, in some embodiments, a method may include receiving a clock signal having a given period; identifying a target duty cycle; calculating a comparison point based upon the given period and the target duty cycle; generating a PWM signal based upon the clock signal using the comparison point; and varying the comparison point to increase a resolution of an effective duty cycle of the PWM signal.

19 Claims, 4 Drawing Sheets

INCREASING PWM RESOLUTION FOR DIGITALLY CONTROLLED MOTOR CONTROL APPLICATIONS

This application claims priority to U.S. Provisional Patent Application Ser. No. 62/113,837 titled "INCREASING PWM RESOLUTION FOR DIGITALLY CONTROLLED MOTOR CONTROL APPLICATIONS" and filed on Feb. 9, 2015, which is incorporated by reference herein.

TECHNICAL FIELD

This specification is directed, in general, to motor control, and, more specifically, to systems and methods for increasing Pulse Width Modulation (PWM) resolution for digitally controlled motor control applications.

BACKGROUND

Electric motors come in a variety of designs. Generally speaking, electric motors are driven by applying an electrical current to the inputs of the motor. The electric current then creates a magnetic field that turns the motor's rotor.

A motor can controlled by controlling certain aspects of the electric current applied to it. For instance, various controllers may include manual or automatic mechanisms for manipulating the electric current in order to start and stop the motor, select forward or reverse rotation, select and regulate the speed, regulate or limit the torque, protect against overloads and faults, etc.

A conventional approach for implementing current control when driving a direct current (DC) motor, for example, is Pulse Width Modulation (PWM). With PWM, a driving voltage is modulated by a square wave. The duty cycle of the PWM signal determines the average voltage applied to the motor, which in turn determines the amount of current delivered to the motor.

SUMMARY

Systems and methods for increasing Pulse Width Modulation (PWM) resolution for digitally controlled motor control applications are described. In an illustrative, non-limiting embodiment, a method may include: receiving a clock signal having a given period; identifying a target duty cycle; calculating a comparison point based upon the given period and the target duty cycle; generating a Pulse-Width Modulated (PWM) signal based upon the clock signal using the comparison point; and varying the comparison point to increase a resolution of an effective duty cycle of the PWM signal. The method may also include applying the PWM signal to a motor.

In some cases, varying the comparison point further comprises periodically varying the comparison point. Additionally or alternatively, varying the comparison point may include: increasing the comparison point during a first period of the clock signal; and restoring the comparison point to its calculated value during a second period immediately following the first period.

The method may include, in response to an accumulated duty cycle of the PWM signal being smaller than a target duty cycle, increasing the comparison point for a subsequent period. The method may also include, in response to an accumulated duty cycle of the PWM signal being greater than or equal to a target duty cycle, using the original value of the calculated comparison point for a subsequent period. In some cases, an average difference between the accumulated duty cycle of the PWM signal and the target duty cycle over a selected number of cycles is zero.

For example, the selected number of cycles may be four, and varying the comparison point includes periodically increasing a comparison count by 1 for a number of the selected number of cycles to produce an increased resolution corresponding to a quarter of a comparison count. Conversely, if the selected number of cycles is five, varying the comparison point may include periodically increasing a comparison count by 1 for a number of the selected number of cycles to produce an increased resolution corresponding to a fifth of a comparison count.

In another illustrative, non-limiting embodiment, an electronic circuit may include: a controller; and a memory coupled to the controller, the memory having program instructions stored thereon that, upon execution by the controller, cause the controller to: generate a PWM signal based upon a clock signal using a comparison point; and increase a resolution of an effective duty cycle of the PWM signal by periodically varying the comparison point.

The controller may, in response to an accumulated duty cycle of the PWM signal being smaller than a target duty cycle, increase a current value of the comparison point for an immediately subsequent period. The controller may also, in response to an accumulated duty cycle of the PWM signal being greater than a target duty cycle, decrease a current value of the comparison point for an immediately subsequent period. In some implementations, an average difference between the accumulated duty cycle of the PWM signal and the target duty cycle over a predetermined number of cycles is zero.

In yet another illustrative, non-limiting embodiment, a device may include: an electronic circuit configured to: generate a PWM signal based upon a clock signal using a comparison count; evaluate a duty cycle of the PWM signal against a target duty cycle; and based upon the evaluation, increase a resolution of an effective duty cycle of the PWM signal by periodically increasing the comparison count; and an electric motor coupled to the electronic circuit, the electric motor configured to be driven by the PWM signal.

The electronic circuit may be further configured to, in response to an accumulated duty cycle of the PWM signal being smaller than a target duty cycle, increase a current value of the comparison count for an immediately subsequent period. The electronic circuit may also be configured to, in response to an accumulated duty cycle of the PWM signal being greater than a target duty cycle, decrease a current value of the comparison count for an immediately subsequent period.

Again, the average difference between an accumulated duty cycle of the PWM signal and the target duty cycle over a predetermined number of periods may be zero. The predetermined number of cycles may be N, and wherein the electronic circuit may be configured to increase a comparison count by 1 during one or more of the predetermined number of cycles to produce an increased resolution corresponding to a 1/N of a comparison count. In various situations, N may be two, three, four, five, or six. The electronic circuit may be further configured to distribute the increase in comparison count uniformly over the predetermined number of cycles.

BRIEF DESCRIPTION OF THE DRAWINGS

Reference will now be made to the accompanying drawings, wherein.

DETAILED DESCRIPTION

The techniques of this disclosure now will be described more fully hereinafter with reference to the accompanying drawings. The techniques of this disclosure may, however, be embodied in many different forms and should not be construed as limited to the embodiments set forth herein. Rather, these embodiments are provided so that this disclosure will be thorough and complete, and will fully convey the scope of the disclosure to a person of ordinary skill in the art. A person of ordinary skill in the art may be able to use the various embodiments described herein.

Systems and methods described herein relate generally to motor control. In various embodiments, the techniques discussed may provide increased PWM resolution for digitally controlled motor control applications.

Figure 1:
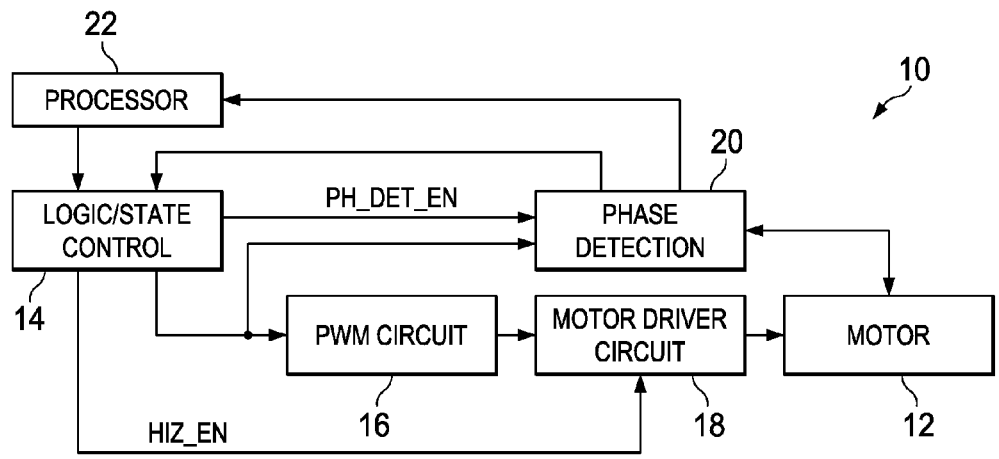
FIG. 1 is a block diagram illustrating an example of a motor control system according to some embodiments.

FIG. 1 illustrates an example of a motor control system 10 configured to control motor 12 in accordance with some embodiments. By way of example, motor 12 is a three phase DC brushless motor, although other DC motors also could be controlled in similar ways.

System 10 includes logic/state control block 14 programmed and/or configured to implement logic and state control for system 10. Control block 14 also is programmed and/or configured generate driver waveforms to selectively energize phase windings of motor 12 in a desired manner. That is, control block 14 provides analog drive signals that are utilized to selectively conduct current through the phases of motor.

In particular, control system 14 provides drive signals (e.g., substantially sinusoidal waveforms) to Pulse Width Modulation (PWM) circuit 16. PWM circuit 16 is operative to derive the corresponding PWM output signals, such as based on a comparison between the drive signals and other input signals (e.g., triangular wave signals). PWM circuit 16 provides PWM output signals to a respective motor driver system 18. Motor driver system 18, in turn, provides phase current to the respective phases of the motor based on the PWM signals. For example, motor driver 18 may provide sinusoidal phase current for each phase of motor 12 based on the PWM output signals.

Phase detection circuit 20 is coupled to detect an electrical characteristic of each of the motor phases and provide one or more corresponding output signals to the control block 14 based on detected electrical condition. For example, phase detection system 20 may be programmed and/or configured to detect a phase voltage of the respective phases of motor 12 when enabled by control block 14.

In some implementations, control block 14 may be configured to provide a phase detect enable signal (PH_DET_EN) to phase detection circuit 20 as well as a high impedance enable signal (HIZ_EN) to motor driver circuit 18. The PH_DET_EN and HIZ_EN signals are coordinated, such that a given phase is commanded to float (that is, to enter a high impedance state) prior to enabling phase detection for such phase. It is to be understood and appreciated that the time difference between enabling phase detection and enabling a high impedance state of a phase winding can be fixed or variable, which further may be programmed by a user or manufacturer of the motor system 10.

System 10 can also be utilized to implement autonomous speed control. For example, system 10 can include a speed control loop having processor or microcontroller 22 that receives a feedback signal from the phase detection block. For example, processor 22 may be programmed to derive an indication of motor speed as a function of motor commutation. There are various known ways to determine motor speed as a function of a commutation signal or a signal related to commutation. Then, processor 22 provides a speed control signal to control block 14 that is utilized to adjust motor energization to achieve a desired motor speed.

Referring back to PWM circuit 16, there are limits on how much PWM resolution can be obtained for a given PWM frequency. In general, input frequencies cannot be stretched beyond certain limits because of number of design and cost constraints. Accordingly, conventional circuits may use either PLL techniques or delay logics to get the higher PWM resolution for the given PWM frequency.

Usually for motor control applications, a 20 kHz PWM frequency is enough, but when it comes to higher speed/lower inductance motors, higher PWM frequencies are demanded from same available resources. In such situations, compromise is made on PWM resolution for increasing the frequency.

Using the techniques described herein, however, system 10 may increase either resolution or frequency given the same resources. Although these techniques are particularly applicable for a digital motor control, they may also be implemented in buck and boost converters, for example.

Figure 2:
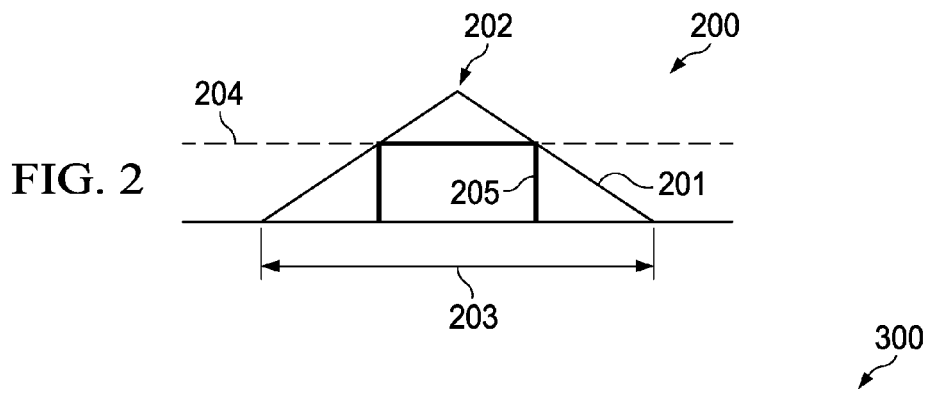
FIG. 2 is a graph illustrating an example of Pulse Width Modulation (PWM) signal generation according to some embodiments.

FIG. 2 is a graph illustrating an example of Pulse Width Modulation (PWM) signal generation 200. In some embodiments, signal generation 200 may be performed by PWM circuit 16 shown in FIG. 1. As shown, timing or clock signal 201 has a triangular shape with period register 202 (that is, the peak of the triangular wave)—in other implementations, however, other types of timing signals may be used. The length of a pulse is given by a number of periods or steps 203. As timing signal 201 oscillates up and down over time, a circuit monitors the value of the signal. When timing signal 201 crosses compare point 204 in its upswing, it starts a square signal 205. Then, when timing signal 201 reaches compare point 204 in its downswing, the square signal 205 goes backs to zero. In this manner, PWM signal 205 is generated based upon timing signal 201 and compare point 204.

The PWM resolution is determined by the PWM timer input clock frequency and desired PWM frequency, such that the number of steps 203 is equal to the frequency of the PWM timer input clock divided by the frequency of PWM signal 205. For example, for a timer running with 25 MHz of input frequency and 20 kHz of PWM frequency, the number of steps 203 is given by: 25 MHz/20 kHz=1250.

Compare point 204, when changed, results in a change to the duty cycle of PWM signal 205. The number of steps 203 decides the PWM frequency, denoted by period register value 202. For a fixed PWM frequency, the number of steps 203 is kept constant for a given application. As a result, $$PWM_{Duty\ Cycle} = \text{Compare Point/Period Register}$$

To increase the PWM frequency, conventional techniques employ phase locked loops (PLL) circuits for increasing the input frequency to the timer; however, this has its own limitations of designing a high speed subsystem, power consumption, cost and accuracies. Alternative existing techniques may use delay-based logic to enhance the PWM frequency (e.g., temperature compensation for all the blocks is one crucial design criteria). In general, increasing the frequency of the timing signal is a simple solution to increasing the resolution of the PWM signal, but it comes with power and complexity overheads.

In motor applications, the motor's winding (which has an inductance element) is such that, in some examples, only the average voltage applied across its terminals matters. Accordingly, in various embodiments, compare register value 204 may be changed every cycle (or every other cycle, etc.) to increase the resolution of the effective duty cycle of the PWM signal 205 at higher PWM frequencies.

Figure 3:
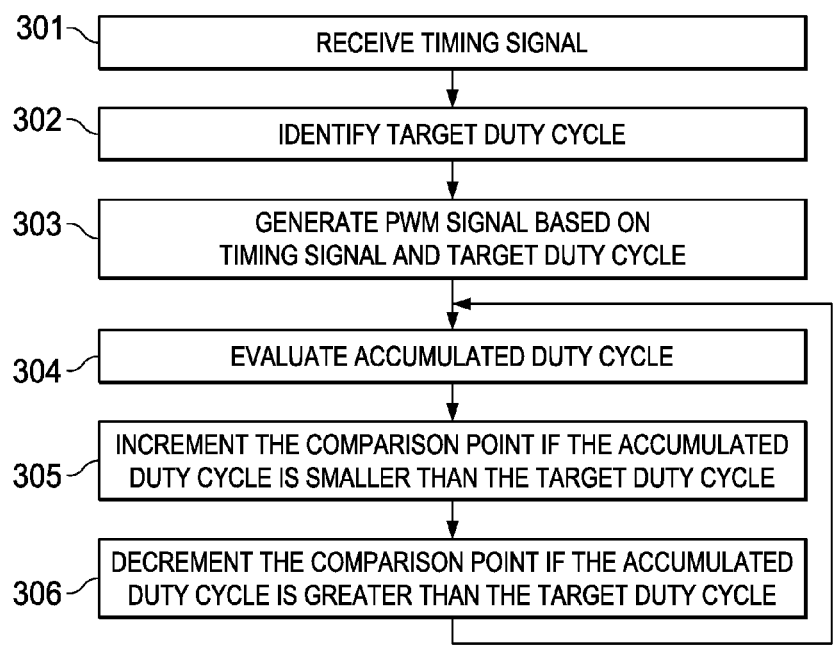
FIG. 3 is a flowchart illustrating an example of a method for increasing PWM resolution according to some embodiments.

FIG. 3 is a flowchart illustrating an example of a method for increasing PWM resolution. In some embodiments, method 300 may be performed, for example, by PWM circuit 16 of FIG. 1. At block 301, method 300 includes receiving a timing signal. At block 302, method 300 includes identifying a target duty cycle. In some cases, the target duty cycle may be such that it would seem to require a compare value that falls between two possible compare values (e.g., a compare value of 50 would yield a duty cycle of 50, and a compare value of 51 would yield a duty cycle of 51; but the target or desired duty cycle is 50.25, 50.5, or 5.75). Ordinarily, in such a situation, the resolution of the PWM signal would be insufficient to result in the target duty cycle.

At block 303, however, method 300 may generate a PWM signal based on the timing signal and the target duty cycle. Then, at block 304, method 300 may evaluate an accumulated PWM duty cycle. At block 305, if the accumulated duty cycle of the PWM signal is smaller than the target duty cycle, method 300 may increase the comparison point for a subsequent period or step. Conversely, at block 306, if the accumulated duty cycle of the PWM signal is greater than or equal to the target duty cycle, the original value of the calculated comparison point may be used in the subsequent period or step. Then control returns to block 304.

Figure 4:
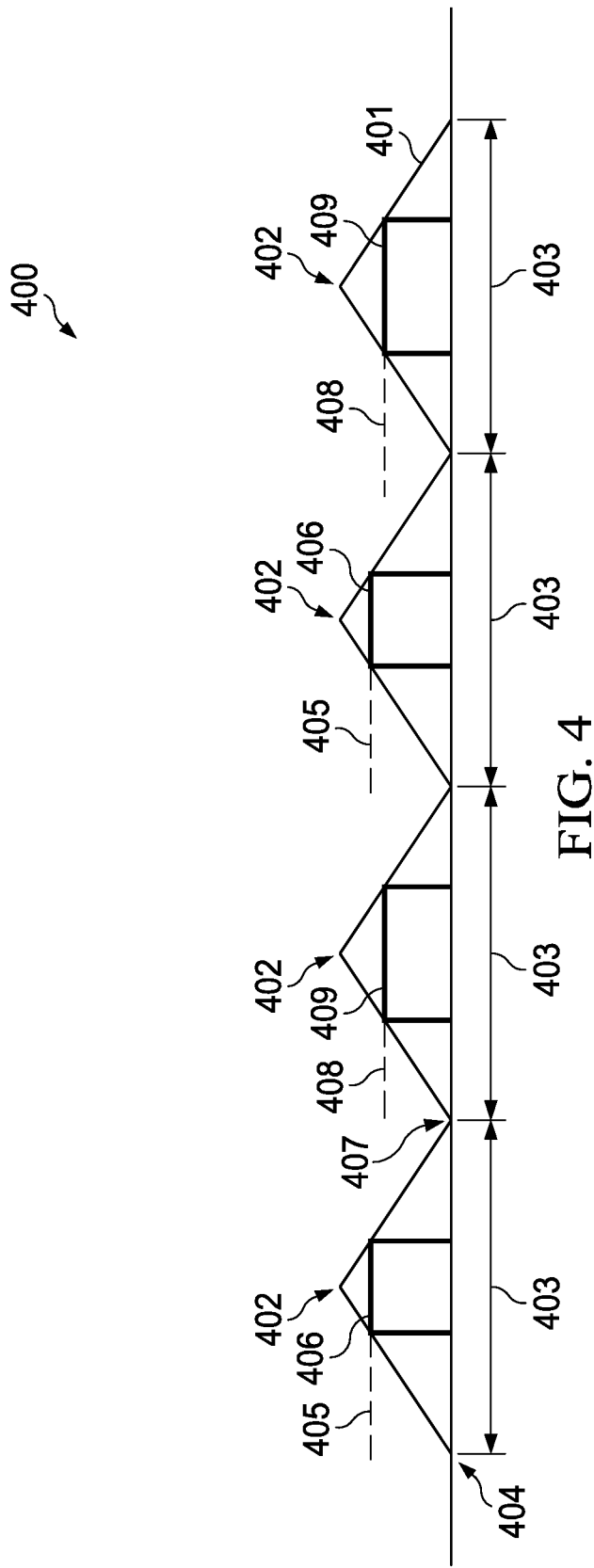
FIG. 4 is a graph illustrating an example of PWM signal generation with increased resolution according to some embodiments.

FIG. 4 is a graph illustrating an example of PWM signal generation with increased resolution according to some embodiments. Particularly, timing signal 401 may be defined by period register 402 (that is, the peak of the triangular wave) and a number of steps 403. In this case, two different compare points 405 and 408 are used to create a PWM signal with alternating portions 406 and 409. Particularly, at time 404, compare point 405 (e.g., with a value of 50) is used to produce PWM pulse 406. Then, at time 407, compare point 408 (e.g., with a value of 51) is used to result in PWM pulse 409.

In above example, assume that compare point 405 has a value "X" and compare point 408 has a value "X+1." In this case, the effective duty cycle obtained will be (X+(X+1))/2=X+0.5, which effective provides twice the duty cycle resolution as would ordinarily be obtained for the same clock signal and PWM frequency. If this is repeated "n" times, the effective resolution of the duty cycle of the resulting PWM signal may be increased by "n" times, compared to a situation where the compare point does not change.

In some embodiments, a software implementation may take an interrupt at the timer starting at zero and update the compare count to give the desired change in output voltage. Alternatively, this process may be implemented in hardware where we can keep a provision (in registers) of adding to the compare count for desired number of cycles. Hardware logic may take the input from user and work out on the error to reach particular output value by evaluating the error parameter (absolute and/or accumulated).

For example, consider a system where the period register count loaded is 100 and the duty cycle expected is 50%. The compare count in this case will be 50, and each compare count change or increment corresponds to a 1% change. To illustrate the foregoing, Table I shows calculations for 4 cycles—that is, increasing resolution 4 times—by incrementing the compare count (either 50 or 51) during a predetermined number of cycles:

TABLE I

| $1^{st}$ Cycle | $2^{nd}$ Cycle | $3^{rd}$ Cycle | $4^{th}$ Cycle | Effective Duty Cycle |
| --- | --- | --- | --- | --- |
| 50 | 50 | 50 | 50 | 50 |
| 51 | 50 | 50 | 50 | 50.25 |
| 51 | 51 | 50 | 50 | 50.5 |
| 51 | 51 | 51 | 50 | 50.75 |

In the first row, every compare count is equal to 50, therefore the effective duty cycle is also 50. In the second row, the first of the 4 cycles has a compare point value of 51, and the next three cycles have a compare value of 50, thus resulting in an effective duty cycle of 50.25. In the third row, the first and second of the 4 cycles have a compare point value of 51, and the next two cycles have a compare value of 50, thus resulting in an effective duty cycle of 50.50. In the fourth row, the first, second, and third of the 4 cycles have a compare point value of 51, and the last cycle has a compare value of 50, thus resulting in an effective duty cycle of 50.75. If all compare values during all 4 cycles had a value of 51, then the effective duty cycle would also be 51.

Accordingly, in the foregoing example, the resolution of the effective duty cycle is increased because there are additional increments of effective duty cycle (that is, 50.25, 50.5, and 50.75) available, although the PWM frequency remains the same. That is, with a same PWM frequency, an increase in resolution of the effective duty cycle is achieved.

Parameters used to implement TABLE I include the number of cycles of resolution change (in this case 4), and the number of cycles to add '1' to the compare count. This way we are increasing the resolution for 4 times and adding '1' to compare count for different cycles for different average duty.

Figure 5:
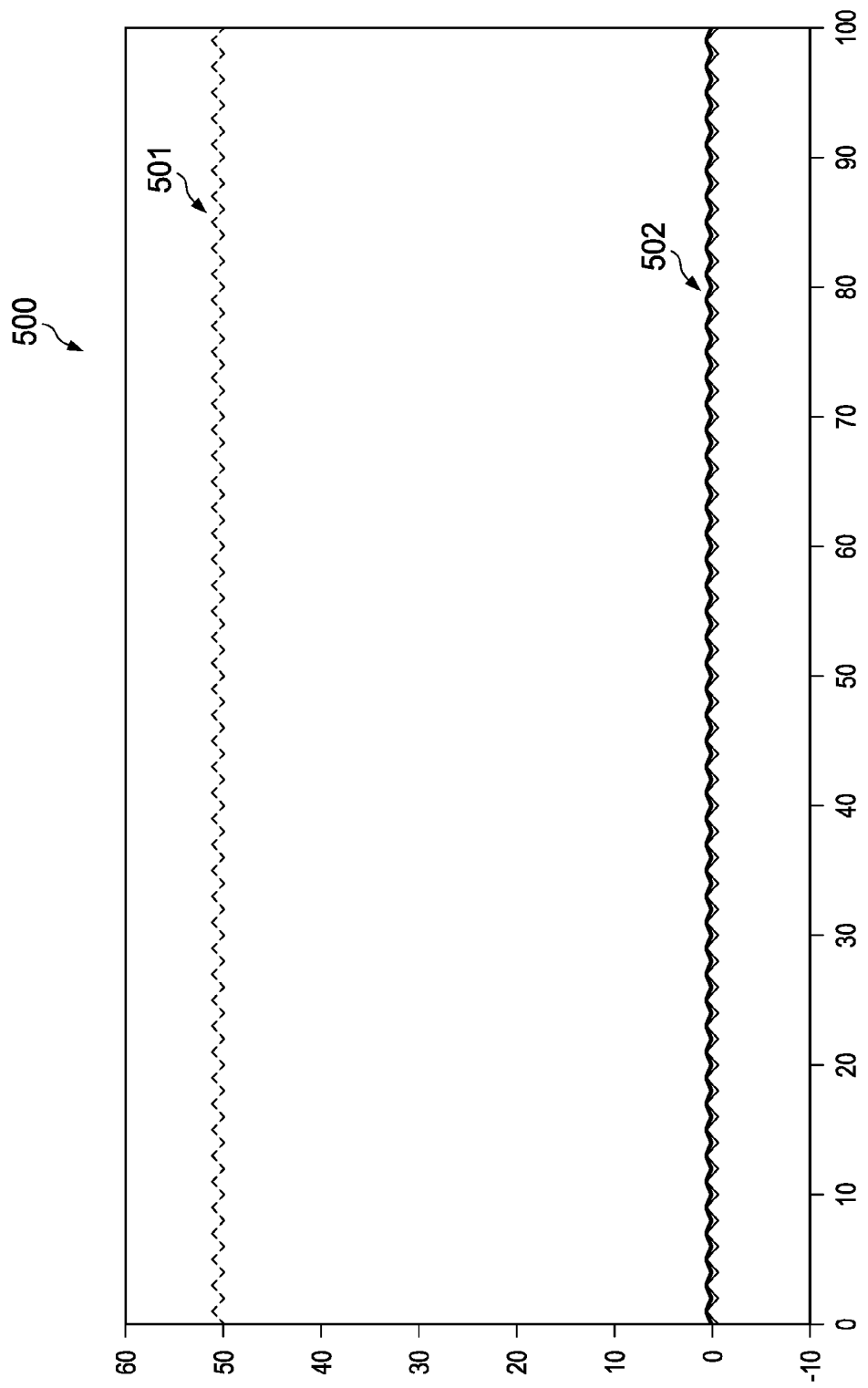
FIGS. 5 and 6 are graphs illustrating simulation results according to some embodiments.
Figure 6:
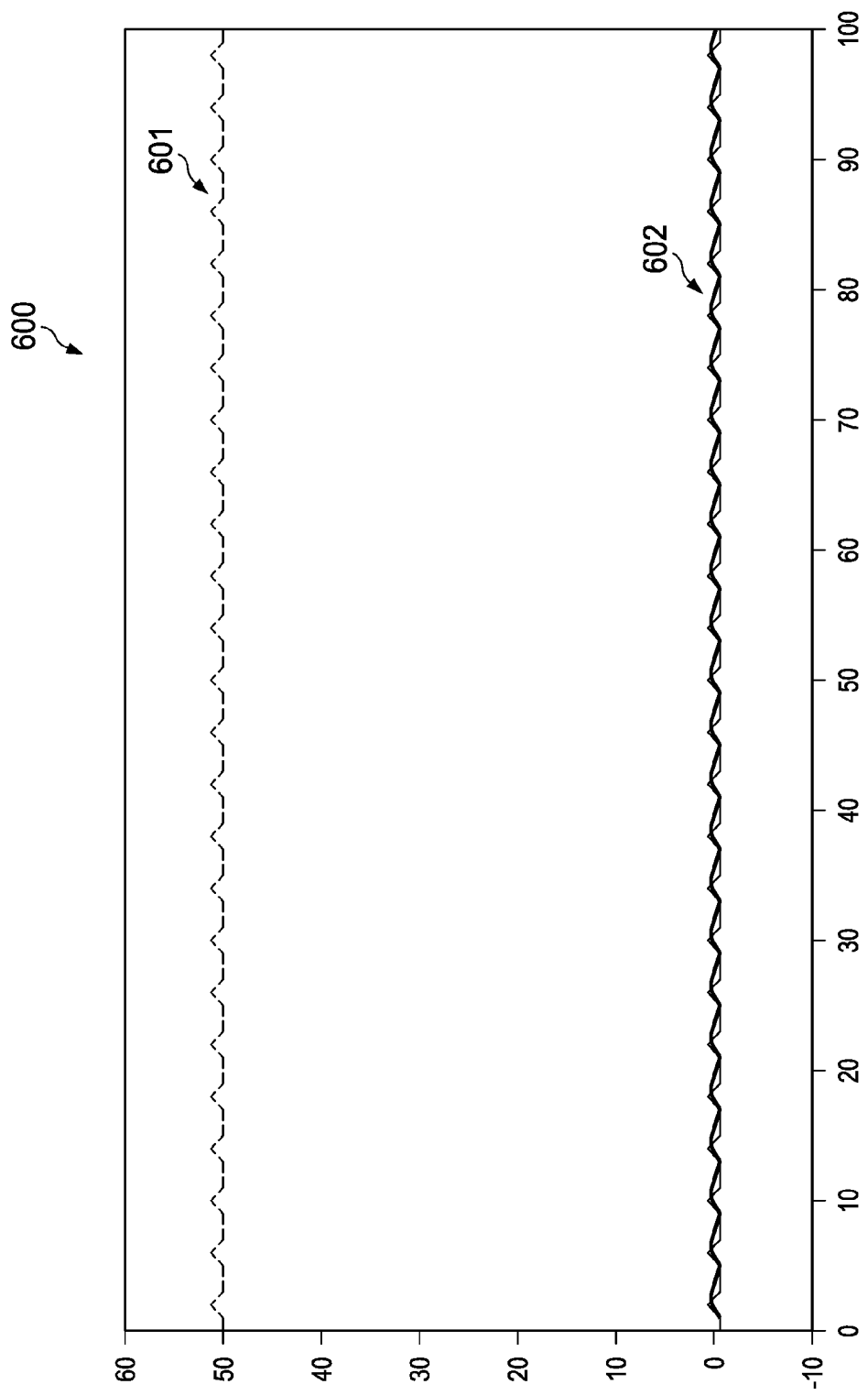

FIGS. 5 and 6 are graphs illustrating simulation results according to some embodiments. In both cases, the number of cycles for the resolution change is 4. Curve 501 shows a resulting duty cycle of 50.25 when the compare count is changed from 50 to 51 during one of every four cycles, and curve 502 shows the absolute and accumulated errors. Meanwhile, curve 601 shows a resulting duty cycle of 50.5 when the compare count is changed from 50 to 51 during two of every four cycles, and curve 602 shows the absolute and accumulated errors.

It should be understood that the various operations described herein may be implemented by processing circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

A person of ordinary skill in the art will appreciate that the various circuits depicted above are merely illustrative and is not intended to limit the scope of the disclosure described herein. In particular, a device or system configured to perform audio power limiting based on thermal modeling may include any combination of electronic components that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other circuit configurations.

It will be understood that various operations discussed herein may be executed simultaneously and/or sequentially. It will be further understood that each operation may be performed in any order and may be performed once or repetitiously.

Many modifications and other embodiments come to mind to one skilled in the art to which this disclosure pertains having the benefit of the teachings presented in the foregoing descriptions, and the associated drawings. Therefore, it is to be understood that this disclosure is not to be limited to the specific embodiments disclosed. Although specific terms are employed herein, they are used in a generic and descriptive sense only and not for purposes of limitation.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
   receiving a clock signal having a frequency;
   selecting a target duty cycle for a Pulse-Width Modulated (PWM) signal and a target PWM frequency for the PWM signal;
   determining multiple different comparison points based on the frequency of the clock signal, the target duty cycle for the PWM signal, and the target PWM frequency, each of the comparison points being determined based on the target duty cycle for the PWM signal; and
   generating the PWM signal based on the clock signal, the target duty cycle, and the comparison points such that different comparison points are used in different PWM periods for at least two consecutive PWM periods of the PWM signal.

2. The method of claim 1, wherein the multiple comparison points include a first comparison point and a second comparison point, and wherein generating the PWM signal includes:
   generating the PWM signal using the first comparison point during a first period of the PWM signal; and
   generating the PWM signal using the second comparison point during a second period of the PWM signal immediately following the first period of the PWM signal.

3. The method of claim 1, further comprising, in response to an accumulated duty cycle of the PWM signal being smaller than the target duty cycle, increasing a comparison point for a subsequent period.

4. The method of claim 1, further comprising, in response to an accumulated duty cycle of the PWM signal being greater than or equal to the target duty cycle, using an original value of a calculated comparison point for a subsequent period.

5. The method of claim 1, wherein an average difference between an accumulated duty cycle of the PWM signal and the target duty cycle over a selected number of cycles is zero.

6. The method of claim 5, wherein the selected number of cycles is four, and wherein the method further includes periodically increasing a comparison count by 1 for a number of the selected number of cycles to produce an increased resolution corresponding to a quarter of a comparison count.

7. The method of claim 5, wherein the selected number of cycles is five, and wherein the method further includes periodically increasing a comparison count by 1 for a number of the selected number of cycles to produce an increased resolution corresponding to a fifth of a comparison count.

8. The method of claim 1, further comprising applying the PWM signal to a motor.

9. An electronic circuit, comprising:
   a controller; and
   a memory coupled to the controller, the memory having program instructions stored thereon that, upon execution by the controller, cause the controller to:
      determine multiple different comparison points based on a frequency of a clock signal, a target duty cycle for a Pulse-Width Modulated (PWM) signal, and a target PWM frequency for the PWM signal, each of the comparison points being determined based on the target duty cycle for the PWM signal; and
      generate the PWM signal based on the clock signal, the target duty cycle, and the comparison points such that different comparison points are used in different PWM periods for at least two consecutive PWM periods of the PWM signal.

10. The electronic circuit of claim 9, wherein the program instructions, upon execution, further cause the controller to, in response to an accumulated duty cycle of the PWM signal being smaller than the target duty cycle, increase a current value of a comparison point for an immediately subsequent period.

11. The electronic circuit of claim 10, wherein the program instructions, upon execution, further cause the controller to, in response to an accumulated duty cycle of the PWM signal being greater than the target duty cycle, decrease a current value of a comparison point for an immediately subsequent period.

12. The electronic circuit of claim 10, wherein an average difference between an accumulated duty cycle of the PWM signal and the target duty cycle over a predetermined number of cycles is zero.

13. A device, comprising:
an electronic circuit configured to:
determine multiple different comparison points based on a frequency of a clock signal, a target duty cycle for a Pulse-Width Modulated (PWM) signal, and a target PWM frequency for the PWM signal, each of the comparison points being determined based on the target duty cycle for the PWM signal; and
generate the PWM signal based on the clock signal, the target duty cycle, and the comparison points such that different comparison points are used in different PWM periods for at least two consecutive PWM periods of the PWM signal, the device further comprising:
an electric motor coupled to the electronic circuit, the electric motor configured to be driven by the PWM signal.

14. The device of claim 13, wherein the electronic circuit is further configured to, in response to an accumulated duty cycle of the PWM signal being smaller than the target duty cycle, increase a current value of a comparison count for an immediately subsequent period.

15. The device of claim 13, wherein the electronic circuit is further configured to, in response to an accumulated duty cycle of the PWM signal being greater than the target duty cycle, decrease a current value of a comparison count for an immediately subsequent period.

16. The device of claim 13, wherein an average difference between an accumulated duty cycle of the PWM signal and the target duty cycle over a predetermined number of periods is zero.

17. The device of claim 16, wherein the predetermined number of cycles is N, and wherein the electronic circuit is further configured to increase a comparison count by 1 during one or more of the predetermined number of cycles to produce an increased resolution corresponding to a 1/N of a comparison count.

18. The device of claim 17, wherein N is two, three, four, five, or six.

19. The device of claim 17, wherein the electronic circuit is further configured to distribute the increase in comparison count uniformly over the predetermined number of cycles.

\* \* \* \* \*